(12) United States Patent
Linkner, Jr. et al.

(10) Patent No.: US 7,195,226 B2
(45) Date of Patent: Mar. 27, 2007

(54) SOLENOID VALVE WITH SPHERICAL ARMATURE

(75) Inventors: Herbert L. Linkner, Jr., Dexter, MI (US); Gamil M. Rizk, Canton, MI (US)

(73) Assignee: Kelsey-Hayes Company, Livonia, MI (US)

( * ) Notice: Subject to any disclaimer, the term of this patent is extended or adjusted under 35 U.S.C. 154(b) by 76 days.

(21) Appl. No.: 10/927,917

(22) Filed: Aug. 27, 2004

(65) Prior Publication Data

US 2006/0043326 A1 Mar. 2, 2006

(51) Int. Cl.
*F16K 31/02* (2006.01)

(52) U.S. Cl. ............................ 251/129.15; 303/119.2; 335/280

(58) Field of Classification Search .......... 251/129.14, 251/129.15, 333; 335/280, 279, 261; 303/119.2
See application file for complete search history.

(56) References Cited

U.S. PATENT DOCUMENTS

| | | | | |
|---|---|---|---|---|
| 3,856,260 A | * | 12/1974 | Giordano | 251/129.14 |
| 4,556,085 A | | 12/1985 | Warrick | |
| 4,570,904 A | | 2/1986 | Mullally | |
| 4,595,035 A | * | 6/1986 | Warrick | 251/129.14 |
| 4,722,482 A | * | 2/1988 | Jordan et al. | 251/129.14 |
| 4,805,870 A | * | 2/1989 | Mertz | 335/261 |
| 4,883,252 A | * | 11/1989 | Mesenich | 251/129.15 |
| 4,981,282 A | * | 1/1991 | Krauss | 251/129.15 |
| 4,984,549 A | | 1/1991 | Mesenich | |
| 5,033,716 A | | 7/1991 | Mesenich | |
| 5,088,467 A | | 2/1992 | Mesenich | |
| 5,269,490 A | * | 12/1993 | Fujikawa et al. | 251/129.14 |
| 5,556,175 A | * | 9/1996 | Hayakawa et al. | 303/119.2 |
| 5,983,922 A | | 11/1999 | Laing et al. | |
| 6,124,775 A | * | 9/2000 | Linkner, Jr. | 251/129.15 |
| 6,276,663 B1 | * | 8/2001 | Anderson et al. | 251/129.02 |
| 6,520,600 B1 | * | 2/2003 | Tackett et al. | 303/119.2 |
| 6,679,567 B1 | | 1/2004 | Tackett et al. | |

FOREIGN PATENT DOCUMENTS

| | | |
|---|---|---|
| DE | 22 21 929 B1 | 8/1973 |
| EP | 0 670 445 A1 | 9/1995 |
| EP | 1 065 116 A3 | 1/2001 |

* cited by examiner

*Primary Examiner*—John Bastianelli
(74) *Attorney, Agent, or Firm*—MacMillan, Sobanski and Todd, LLC

(57) ABSTRACT

A valve includes a valve body, a flux tube, and a winding. The body defines first and second passageways, and a circular opening is defined in the second passageway providing fluid communication between the passageways. The flux tube has a closed end, an open end, and a hollow armature receiving section. The open end is in fluid communication with the first passageway. A spherical armature is disposed in the armature receiving section for reciprocating movement between a closed position sealing against the circular opening to prevent communication between the passageways and an open position spaced apart from the opening permitting communication between the passageways. The winding is disposed about the flux tube for electromagnetically positioning the armature. The flux tube forms a fluid tight pressure boundary between the winding and the passageways. A spring urges the armature toward one of the open position and the closed position.

11 Claims, 6 Drawing Sheets

SOLENOID VALVE WITH SPHERICAL ARMATURE

BACKGROUND OF THE INVENTION

This invention relates in general to solenoid valves and specifically to a solenoid valve with a spherical armature.

BRIEF SUMMARY OF THE INVENTION

This invention relates to solenoid valves, and in particular to a solenoid valve that includes a spherical armature. The solenoid valve according to the invention includes a valve body defining a first body fluid passageway and a second body fluid passageway therethrough. The valve body has a seating surface defining a circular opening in the valve body communicating with the second body fluid passageway. The circular opening in the seating surface has a diameter $D_s$. The circular opening provides fluid communication between the first body fluid passageway and the second body fluid passageway. The solenoid valve further includes a flux tube having a closed end and an open end. The open end of the flux tube is in fluid communication with the first body fluid passageway. The flux tube has a hollow armature receiving section that has an inner diameter $D_f$. The solenoid valve also includes a spherical armature disposed in the armature receiving section of the flux tube. The armature moves in the armature receiving section between a closed position and an open position. In the closed position the armature seals against the seating surface of the body about the circular opening to prevent communication between the first body fluid passageway and the second body fluid passageway. In the open position, the armature is spaced apart from the seat circular opening, thus permitting communication between the first body fluid passageway and the second body fluid passageway. The armature has a diameter $D_a$ which is related to the diameter of the seat circular opening and the diameter of the armature receiving section according to the formula, $D_f > D_a > D_s$. A winding is disposed about the flux tube for electromagnetically positioning the armature, the flux tube forming a fluid tight pressure boundary between the winding and the first and second body fluid passageways. A spring is provided which urges the armature toward one of the open position and the closed position.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
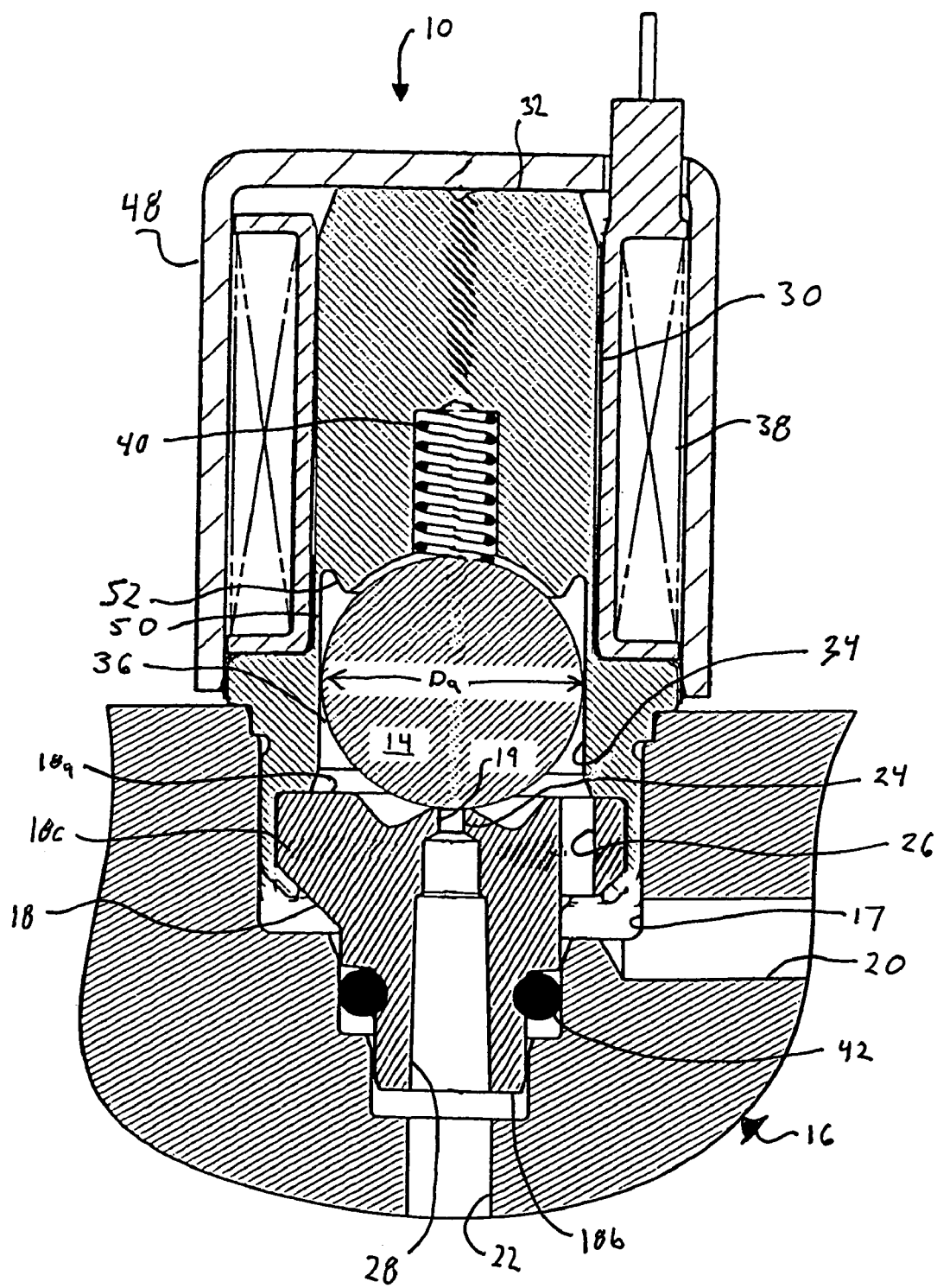
FIG. 1 is a sectional view of a normally closed solenoid valve according to the present invention.

Referring now to the drawings, there is illustrated in FIG. 1 a normally closed solenoid valve, indicated generally at 10, having a spherical armature 14. The valve 10 is disposed in a valve housing, indicated generally at 16. The illustrated housing 16 may be that of a Hydraulic Control Unit (HCU) such as is employed in automotive brake systems. In such a case, the valve 10 may be used, for example, as a dump valve in an ABS (Anti-lock Braking System) brake circuit. However, it will be appreciated, in light of the following disclosure, that the invention may be practiced with valve housings other than automotive HCUs and that the housing 16 may be the housing of any component with which one would want to make use of the valve 10. It will also be appreciated that the valve 10 may be used for any suitable application, including both automotive and non-automotive applications. In use in automotive brake systems, it is expected that the housing 16 will be formed of an aluminum alloy, however, it will be appreciated that the housing 16 (and indeed, the other components of the valve 10) may be formed from any of various materials suitable for the application in which the valve 10 may be used.

The housing 16 defines a valve bore 17 therein. The valve bore 17 is suitable for receiving the valve 10. The housing 16 defines a first housing fluid passageway 20 therethrough. The housing 16 defines a second housing fluid passageway 22 therethrough. The first housing fluid passageway 20 and the second housing fluid passageway 22 are in fluid communication via the valve bore 17 and the valve 10, as will be described below.

Figure 2:
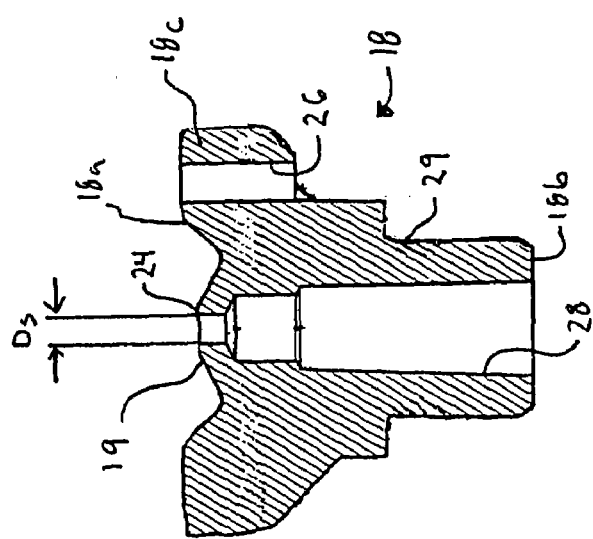
FIG. 2 is a sectional view of the valve body of FIG. 1.

The valve 10 includes a valve body 18 disposed in the valve bore 17. As best shown in FIG. 2, the body 18 has a first end 18a and a second end 18b. A generally radially outwardly extending flange 18c is formed on the body 18 at the first end 18a, the purpose of which will be described below. The body 18 defines at least one first body fluid passageway 26, extending from the first end 18a to a point on the radially outer surface of the body 18 at a point between the flange 18c and the second end 18b. The body 18 defines a second body fluid passageway 28 therethrough between the first end 18a and the second end 18b. The body 18 defines a valve seat 19 in the first end 18a. The body 18 defines a circular opening 24 in the valve seat 19 and in the second body fluid passageway 28 at the first end 18a. Although the face of the first end 18a may be planar (not illustrated), preferably the center portion about the valve seat 19 will protrude slightly to provide improved fluid flow patterns when the armature 14 is positioned near the valve seat 19. As illustrated in FIGS. 1 and 2, in a preferred embodiment, this protrusion of the face of the first end 18a will be conical.

The valve seat 19 as shown is defined as a corner of the second fluid passageway 28 and the face of the first end 18a. It is contemplated that this corner may, if desired, be chamfered somewhat to enlarge the circular opening 24 into the second fluid passageway 28 to provide a more durable beveled seating surface against which the armature 14 will reciprocate (not shown). The circular opening 24 has a diameter $D_s$, as indicated by dashed lines in FIG. 2; if the circular opening 24 into the second fluid passageway 28 is chamfered as suggested in the preceding sentence, then the diameter $D_s$ would be measured at the point of greatest diameter.

It should be noted that although the first body fluid passageway 26 is illustrated as being in the form of a bore extending from an opening on the axial end face of the first end 18a at a point radially outside of the valve seat 19 through the body 18 to an opening the radially outer surface of the body 18 at a point between the flange 18c and the second end 18b, each of the at least one first body fluid passageways 26 may be suitably formed as a groove in the outer surface of the body 18 (not illustrated).

It is also contemplated that the valve 10 could include the body 18 with the seat 19 configured to server as both a seat for the ball armature 14 and as a flow control orifice (not shown). For example, the seat 19 may be a 0.90 millimeter seat hole also having a stepped bore so that includes a bottom portion reduced to 0.35 millimeter in diameter. The bottom portion, being or reduced diameter, acts as a flow control orifice to restrict fluid flow therethrough while the circumferential edge of the larger 0.90 millimeter diameter portion acts as the seat 19 for the armature 14. The bottom portion may also have disposed therein a filter, for example of imbedded mesh or any other interference that suitably fits within the valve 10.

Preferably, the valve 10 includes a seal 42. As shown the seal 42 is an O-ring. The seal 42 is disposed radially about the outer surface of the body 18 as indicated at 29. The seal 42 is in sealing engagement between the valve 10 and the housing 16 to restrict fluid communication from the first housing fluid passageway 20 to the second housing fluid passageway 22 via the valve bore 17 directly (that is, outside of the valve 10). In one preferred embodiment the seal 42 is a lip seal. Further, it must be understood that the body 18 may optionally include a circumferential groove (not shown) at 29 in the radially outer surface of the body 18. In such a case, it is contemplated that the seal 42 may be disposed in the circumferential groove.

Figure 3:
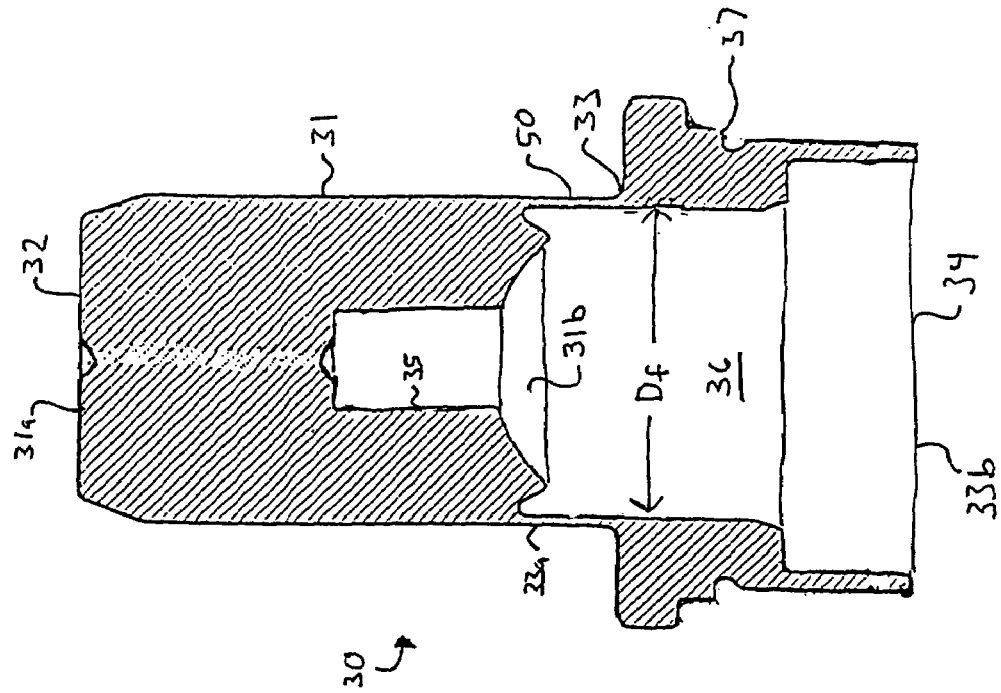
FIG. 3 is a sectional view of the flux tube of FIG. 1.

The valve 10 further includes a flux tube 30. As best shown in FIG. 3, the flux tube 30 has a pole portion 31 and a cylindrical sleeve portion 33. The sleeve portion 33 includes a circumferential clinch portion 37, the purpose of which will be discussed below. Preferably, the pole portion 31 and the sleeve portion 33 are formed integrally.

The pole portion 31 of the flux tube 30 has a first end 31a opposite the sleeve portion 33. The first end 31a defines a closed end 32 of the flux tube 30. The pole portion 31 has a second end 31b adjacent the sleeve portion 33. The pole portion 31 includes a spring bore 35 in the second end 31b. As will be further discussed below, the face of the second end 31b is preferably generally concave with respect to the rest of the pole portion 31, even apart from the spring bore 35. In one preferred embodiment (shown in FIG. 7), the second end 31b is shaped as a hemispherical section with a partial conical section and with a radiused transition section between. Additionally, as will be described further below, it is contemplated that the exact contour of the face of the second end 31b will often not be a precise hemisphere, but rather that various bosses, lands, grooves, and curved or frustoconical surfaces may be provided on the face of the second end 31b to achieve a desired magnetic field contour (desired magnetic force versus travel characteristics) to support the design objectives of a particular application for the valve 10.

For example, in one preferred embodiment (not shown), the pole section 31 may have a concave face of the second end 31b, which has a significantly larger radius than the ball armature 14, thus decreasing the residual magnetism axial force of the ball armature 14 toward the pole section 31, thus allowing faster release of the ball armature 14 from the pole section 31 when the valve 10 is deenergized, allowing faster closing of the valve 10. This larger spherical radius also allows the ball armature 14, which tends to be magnetically attracted radially to the sidewall of the sleeve portion 33, to roll up the sidewall of the sleeve portion 33 until the ball armature 14 contacts the hemispherical concave pole area, the second end 31b, and roll on this larger hemispherical pole area until the ball armature 14 is centered on the second end 31b.

For further example, in another preferred embodiment (not shown), the pole portion 31 is shaped conically, thus increasing the length and reluctance of the thinned section 50 of the sleeve 33 to decrease magnetic flux through the sleeve 33 and concentrates flux to the ball armature 14. This conical shape of the pole portion 31 is expected to increase the useful axial force generated by the solenoid by approximately 19%, as compared to a pole portion 31 with a flat planar section that is normal to the axial direction.

The sleeve portion 33 of the flux tube 30 has a first end 33a adjacent the pole portion 31. The sleeve portion 33 has a second end 33b opposite the pole portion 31. The second end 33b defines an open end 34 of the flux tube 30. In a preferred embodiment, a thin wall portion of the flux tube 30 between the armature receiving section 36 and the windings 38, generally indicated at 50 in FIG. 3, has a very small wall thickness relative to the rest of the flux tube 30. The thin wall portion 50 of the flux tube 30 allows the flux tube 30 to serve as both a pressure vessel and a primary part of the magnetic circuit as a single piece. The thin wall portion 50, though preferably formed of the same magnetic material as the rest of the flux tube 30, has a high reluctance (low permeability to magnetic flux) owing to the physical thinness of the material in the thin wall portion. As will be made clear below, the purpose of the thin wall portion 50 is to resist the flow of magnetic flux therethrough, so that the majority of the magnetic flux of the solenoid valve 10, which will extend between the pole portion 31 and the sleeve portion 33 of the flux tube 30 will preferentially flow through the armature 14 to induce movement of the armature 14, rather than flowing through the thin wall portion 50. The thin wall portion 50 may short some of the magnetic flux, but when made thin enough or long enough to achieve a significant increase in reluctance (decrease in magnetic permeability) compared to a magnetic flux path through the armature 14, this magnetic flux "loss" will be minimized.

While preferably the flux tube 30 is formed integrally as a single piece, including the pole portion 31, the thin wall portion 50, and the sleeve portion 33, it is also contemplated that the flux tube 30 could be formed otherwise; the pole portion 31, thin wall portion 50, and the sleeve portion 33 may be formed separately and joined in any suitable manner. For example, the sleeve portion may be formed with an elongated thin wall cylindrical upper portion, with the pole portion disposed within the elongated cylindrical upper portion, and fixed to the elongated cylindrical upper portion in a fluid-tight manner. Other arrangements for fabricating a flux tube are known in the art, and may be used as suitable, including forming a pole portion, a cylindrical thin wall flux tube portion, and a clinch portion as separate components, and fixing these three components together in any suitable manner, including welding (in any manner), brazing, pressing, swaging, clinching, use of adhesives, etc., to form the flux tube. It is also contemplated that the thin wall portion 50 could be replaced by thick or thin wall portions made of a material with higher reluctance than the pole portion 31 or the armature 14, such as any suitable non-magnetic material or any other suitable material.

The flux tube 30 has a hollow armature receiving section 36 defined by the interior of the sleeve portion 33 and the concave face of the second end 31b of the pole portion 31. The armature receiving section 36 of the flux tube 30 has an inside diameter $D_f$ as indicated by dashed lines in FIG. 3.

Referring again to FIG. 1, the armature receiving section 36 is in fluid communication with the first housing fluid passageway 20 via the first body fluid passageway 26 of the body 18. The armature receiving section 36 is in fluid communication with the second housing fluid passageway 22 via the open end 34 of the flux tube 30 and the second body fluid passageway 28.

As indicated above, the valve 10 also includes the spherical armature 14. The armature 14 is preferably a standard ball bearing ball of standard material, for example 52100 steel. The armature 14 is also preferably of a standard hardness for ball bearings. However, it must be understood that the armature 14 may also be annealed if desired in order to minimize magnetic hysteresis. Further, it must be understood that the armature 14 may be made of any suitable material such as another steel, steel alloy, or any suitable material with the desired magnetic properties.

The spherical armature 14 is disposed in the armature receiving section 36 of the flux tube 30 for reciprocating movement therein between a closed position sealing against the valve seat 19 the body 18, as shown in FIG. 1, to prevent flow through the second body fluid passageway 28 and an open position spaced apart from the body 18, not shown, permitting fluid flow through the second body fluid passageway 28. The armature 14 has an outside diameter $D_a$, as indicated by dashed lines in FIG. 1, which is related to the diameter of the seat circular opening 24 and the diameter of the armature receiving section 36 according to the formula, $D_f > D_a > D_s$.

In one preferred embodiment the diameter of the armature 14, the diameter of the seat circular opening 24, and the diameter of the armature receiving section 36 are related according to the formula $D_a > D_f - D_s$. Thus, the diameter of the armature 14 is greater than the difference between the diameter of the armature receiving section 36 and the diameter of the seat circular opening 24, and thereby the center of the armature 14 is always above the seat circular opening 24. When the armature 14 is urged in the direction of the seat circular opening 24, the armature 14 thus cannot contact any portion of the ledge around the seat circular opening 24, but rather the armature 14 will contact and center itself relative to the circumferential edge of the seat circular opening 24 of the valve seat 19.

In another preferred embodiment the diameter of the armature 14, the diameter of the seat circular opening 24, and the diameter of the armature receiving section 36 are related according to the formula $D_f - D_a < D_s$. Thus the diameter of the seat circular opening 24 is greater than the difference between the diameter of the armature receiving section 36 and the diameter of the armature 14. This arrangement creates a preferred relationship in diameters that achieves a preferred relationship between fluid flow though the seat circular opening 24 relative to fluid flow around the armature 14.

A spring 40 is disposed in the spring bore 35. The spring 40 acts between a closed end of the spring bore 35 and the armature 14 to urge the armature 14 toward the closed position, in which the armature 14 seals against the valve seat 19. Preferably, the spring 40 is a uniform coil such that it does not matter which end thereof is disposed against the armature 14 and which end thereof is disposed against the closed end of the spring bore 35.

A winding 38 is disposed about the flux tube 30 for electromagnetically positioning the armature 14. The flux tube 30 forms a fluid tight pressure boundary between the winding 38 and the passageways 20, 22, 26, and 28.

Preferably, a casing 48 is disposed about the winding 38. Preferably, the casing 48 forms a seal with the flux tube 30 to enclose and protect the winding 38 and the pole portion 31.

To assemble the valve 10, the spring 40 is inserted into the spring bore 35, and the armature 14 into the armature receiving section 36 of the flux tube 30. As indicated above, preferably the spring 40 is reversible so that assembly is simplified because the spring 40 cannot be inserted backwards. Similarly, as the armature 14 is spherical, the armature 14 cannot be inserted backwards.

Next, the flux tube 30 is fixed to the body 18. As shown in FIG. 3, the second end 33b of the flux tube 30 is manufactured as a cylindrical skirt depending from the clinch portion 37 of the flux tube 30. The flux tube 30 is permanently fixed to the body 18 by axially mating the second end 33b of the flux tube 30 and the first end 18a of the body 18, and then inwardly permanently deforming the (crimping) the skirt portion of the second end 33b over the flange 18c as illustrated in FIG. 1. Of course, any suitable method of joining the flux tube 30 and the body 18 may suitably be used, and it is contemplated that the precise structure of the valve 10 would be suitably modified to provide for other methods of joining (or integral forming). The lip seal 42 may be assembled on the body 18 either before assembly to the flux tube 30, or before inserting the body 18 into the valve bore 17.

Referring again to FIG. 1, the body 18 is disposed in the valve bore 17 with the second end 18b next to and in fluid communication with the second housing fluid passageway 22. In the preferred embodiment, the valve 10 is secured to the housing 16 by the clinch portion 37. The portion of the flux tube 30 below the clinch portion 37 is of a smaller diameter than the bore 17, while the portion of the flux tube 30 above the clinch portion 37 is of a slightly greater diameter than the bore 17. As the assembled body 18 and flux tube 30 are pressed into the bore 17, the portion of the flux tube 30 above the clinch portion 37 deforms a portion of the housing 16 radially inwardly into the groove that is the clinch portion 37, fixing the assembled valve 10 to the housing 16 in the bore 17. However, it must be appreciated that the valve 10 may be secured to the housing 16 in any suitable manner, such as welding or by threaded engagement of the valve 10 and the housing 16 or by any other suitable manner.

The casing 48 and winding 38 are preferably positioned about the flux tube 30 after the valve 10 is fixed to the housing 16.

As indicated above, the face of the second end 31b of the pole portion 31 of the flux tube 30 is shaped to define the desired magnetic force versus travel characteristics. A preferred shape of the face of the second end 31b is close to hemispherical with a radius slightly bigger than the radius of the armature 14, i.e., half of the outside diameter $D_a$ of the armature 14. In an alternative embodiment, the shape of the face of the second end 31b may be slightly parabolic. It must be understood, however, that the generally desirable curved shape of the face of the second end 31b may be approximated by providing multiple chamfers (frustoconical surfaces) (not shown) as desired to minimize manufacturing cost compared with forming a continuous curved surface. It is anticipated that the inclusion of the chamfers will cause only a very slight degradation of output force.

Figure 7:
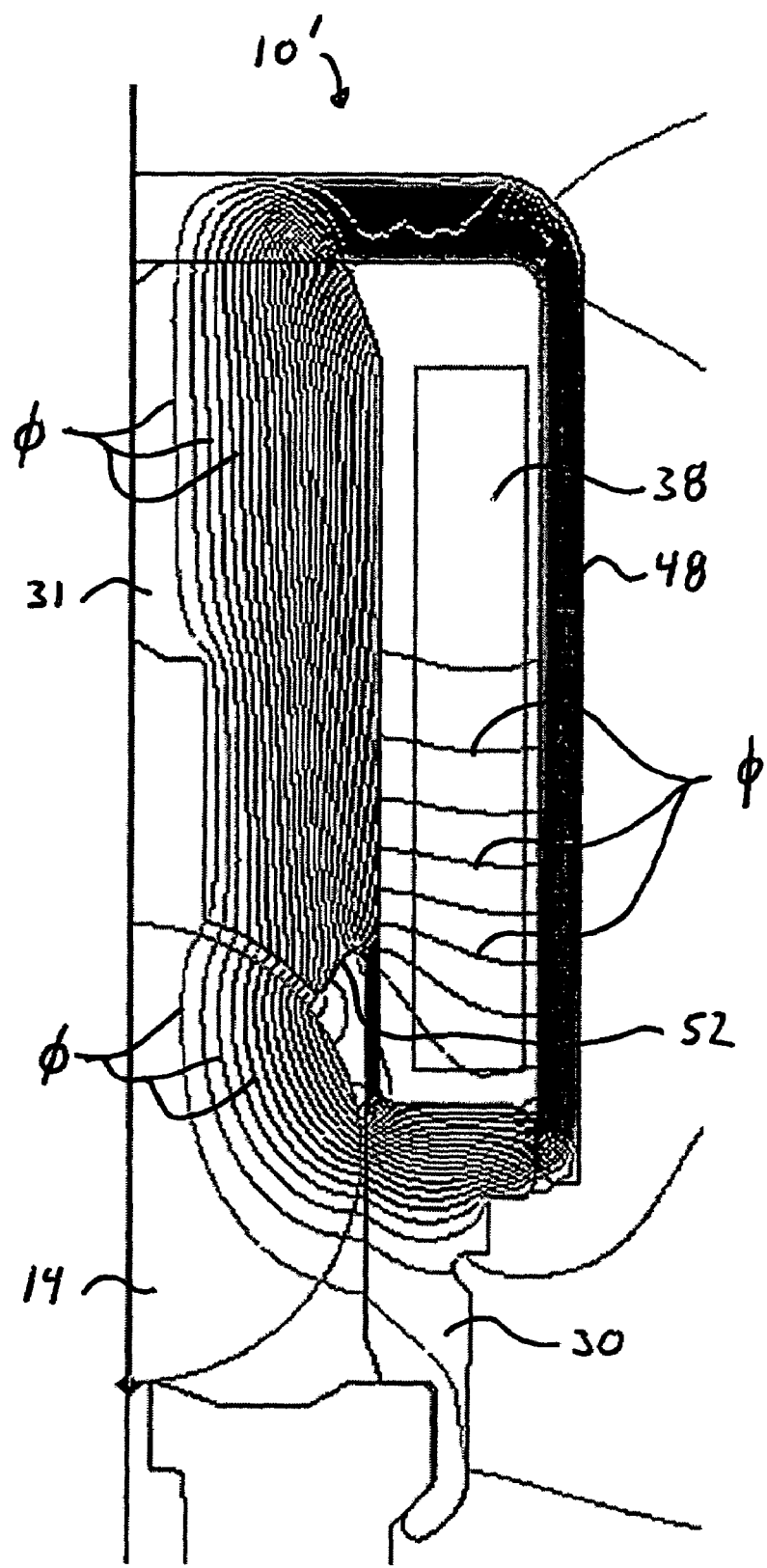
FIG. 7 is an image of a computer simulation of a valve with a flux tube with an end face with an inverted conical section annular area.
Figure 8:
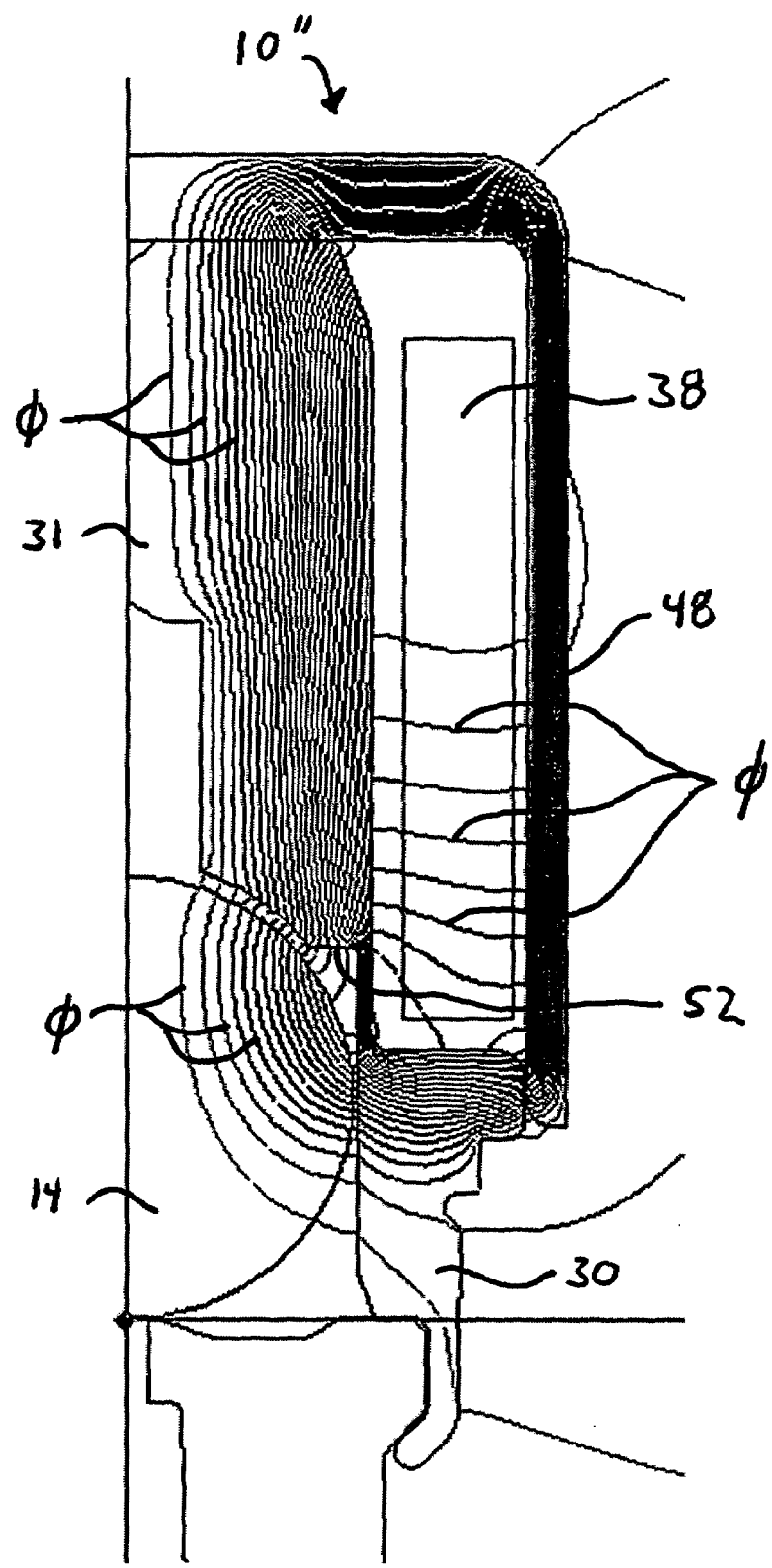
FIG. 8. is an image of a computer simulation of a valve with a flux tube with an end face with a flat annular area.

Furthermore, in the embodiment illustrated in FIGS. 1 and 3, the outer circumference of the face of the second end 31b is formed as an annular inverted partial conical section area 52 centered about a longitudinal axis of the pole portion 31. It must be understood however that the geometry of the annular section 52 may be any suitable geometry, for example the area 52 may be a flat annular area. Changing the geometry of the area 52 serves to change the reluctance of any magnetic flux path between the annular area 52 and the armature 14, causing more or less of the magnetic flux acting between the pole portion 31 and the armature 14 to travel along an axial flux path, as opposed to a radial flow path, allowing changes in the in a magnetic force versus travel characteristics to suit the desired application. For example, under computer simulation a valve 10' with an inverted conical section annular area 52, as shown in FIG. 7, was able to induce an armature to produce 16.1 N of force at 0.34 millimeter of travel and 17.2 N of force at 0.30 millimeter of travel. A similar valve 10", differing only from the valve 10' in that the pole portion 31 has a flat annular area 52, is shown in FIG. 8. The valve 10" was able to induce an armature to produce 14.7 N of force at 0.34 millimeter of travel and 15.7 N of force at 0.30 millimeter of travel. Note that in the computer models shown in FIGS. 7 and 8, the density and paths of the predicted magnetic lines of flux, Φ, were only subtly changed to achieve this difference in magnetic force versus travel characteristic. To further shape the magnetic field to favor an axial flux path, and generally eschew more radial flux paths, the annular area 52 may have a U-shaped groove, V-shaped groove, square groove, interrupted (castellated) groove, or other feature formed therein (not shown). Conversely, in some applications, to achieve a different desired magnetic force versus travel characteristics, the annular area 52 may be eliminated entirely, and the generally hemispherical or parabolic shape of the face of the second end 31b extend to the thin wall portion 50. It is also contemplated that features in the annular area may be integrally formed with the pole portion 31 of the flux tube 30, or may be formed as separate components subsequently fixed to the flux tube 30, if desired; such an arrangement might be desirable if, for example, it was desired to use a material for such a feature which had different magnetic properties than the flux tube 30. In the preferred embodiment illustrated in FIGS. 1 and 3, however, the features in the annular area 52 are integral to the flux tube 30.

As indicated above the valve 10 illustrated in FIGS. 1 and 3, may be useful as for example, a dump valve in a passenger automobile ABS (Anti-lock Braking System) brake circuit. In such an application, the clearance between the armature 14 and the thin wall portion 50, i.e. half of the difference between the inside diameter $D_f$ of the armature receiving section 36 of the flux tube 30 and the outside diameter $D_a$ of the armature 14, is preferably from about approximately 50 microns to about approximately 200 microns. Obviously, though, the preferred size ranges will depend upon the application for which the valve 10 is designed. The clearance between the armature 14 and the thin wall portion 50 allows for magnetic coupling while also allowing for fluid to flow around the armature 14. Thus, the armature 14 may move generally freely, while fluid in the armature receiving section 36 between the armature 14 and the second end 31b of the pole portion 31 still provides damping characteristics that can be beneficially used to control intermediate travel positioning of the armature 14 with respect to the seat 19. The control of intermediate travel positioning of the armature 14 may be achieved, for example, with different input dither and/or duty cycle signals.

Further, when the outside diameter $D_a$ of the armature 14 is maximized, i.e. $D_a$ is as close to as possible to the inside diameter of the flux tube 30 at the thin wall portion 50 while still allowing the valve 10 to function, and the armature 14 is large relative to the rest of the valve 10, both radial magnetic forces and axial magnetic forces act upon the armature 14 to "pull" the armature 14 off the seat 19 against fluid pressure and force provided by the spring 40. Thus, magnetic coupling between the flux tube 30 and the armature 14 is maximized and in turn maximizes the output force. The radial force component has a high moment arm to help unseat the hydraulic seat forces with their much lower moment arm. This allows the magnetic forces of the armature 14 to overcome higher hydraulic seating forces than prior designs with conventional cylindrical armatures. Further, radial forces are typically detrimental to prior designs with normally configured cylindrical armatures in that they cause friction, which results in Coulomb hysteresis and lower useful output force. It must be apreciated, however, that the spherical armature 14 in the preferred embodiment of the present invention is attracted to the thin wall portion 50 of the flux tube 30 and rolls up the thin wall portion 50. Thus, the armature 14 has extremely low moving or rolling resistance, and thus make more efficient use of output force, as compared to prior designs using a cylindrical armature.

Preferably, the radius of the sealing area of the seat 19 (i.e., half of the diameter $D_s$ of the opening 24 defined by the seat 19) is greater than the clearance of the armature 14 in the flux tube 30. For example, a preferred combination of the radius of the sealing area and of the clearance of the armature 14 is a clearance of 0.450 millimeter and a radius of 0.050 millimeter. In such a case, forces which "push" the armature 14 onto the seat 19 are likely to have both an axial component urging the armature 14 toward the seat 19, and a radial component (due to reaction of the armature 14 contacting the edge of the opening 24 unevenly) urging the armature 14 toward the center of circular opening 24, and thus cause the armature 14 to center on and circumferentially seal against the seat 19.

Further, as the armature 14 approaches the circular opening 24, the armature 14 may tend to move side to side in the flux tube 30, restricting fluid flow on one side and allowing greater fluid flow on the other. As the flow is expected to be faster on the unrestricted side, with the fluid therefore at a lower pressure, it is expected that Bernoulli forces will center the armature 14 in the flux tube 30 as the armature 14 travels.

In operation of one preferred embodiment, pressure is preferably applied to the second body fluid passageway 28 of the valve 10. As such, the pressure differential between the second body fluid passageway 28 (the supply port) and the first body fluid passageway 26 (the output port), plus the spring force of the spring 40 holds and seals the ball armature 14 on the seat 19, when in the normal (closed) position.

When the valve 10 transitions from the energized (open) position to the de-energized (closed) position, the ball armature 14 will move towards the seat 19 because of forces applied by the spring 40. If the ball armature 14 were slightly off the center longitudinal axis of the flux tube 30 as the ball armature 14 moves towards the seat 19, the velocity of the fluid on the side of the flux tube 30 with the larger radius gap would have lower Bernoulli force which would will tend to restore or move the ball armature 14 to a centered axial position in the flux tube 30. However, even if the ball armature 14 moved fully towards the sidewall of the sleeve 33 as the ball armature 14 approached the seat 19, the relationship between the diameter $D_f$ of the flux tube 30, the diameter $D_a$ of the armature 14, and the diameter $D_s$ of the seat circular opening 24 according to the relationship $D_f - D_s < D_a$ would ensure that any axial forces acting on the armature 14 would create a moment force on the ball armature 14 which would push the ball armature 14 onto the center of the seat 19.

Additionally, it must be appreciated that in such an operation, fluid cannot flow radially toward the seat 19 on the side where the ball armature 14 is in contact with the seat 19 but would instead flow somewhat circumferentially around the most bottom areas of the ball armature 14 toward the side where the ball armature 14 is not centered and therefore not in contact with the seat 19 and then the ball armature 14 would tend to travel radially to the seat 19 with increased velocity. This causes a Bernoulli force or region of reduced pressure on an area of the ball armature 14 on the side that is not yet in contact with the seat 19. This Bernoulli force further aids in centering and sealing of the ball armature 14 on the seat 19.

Figure 4:
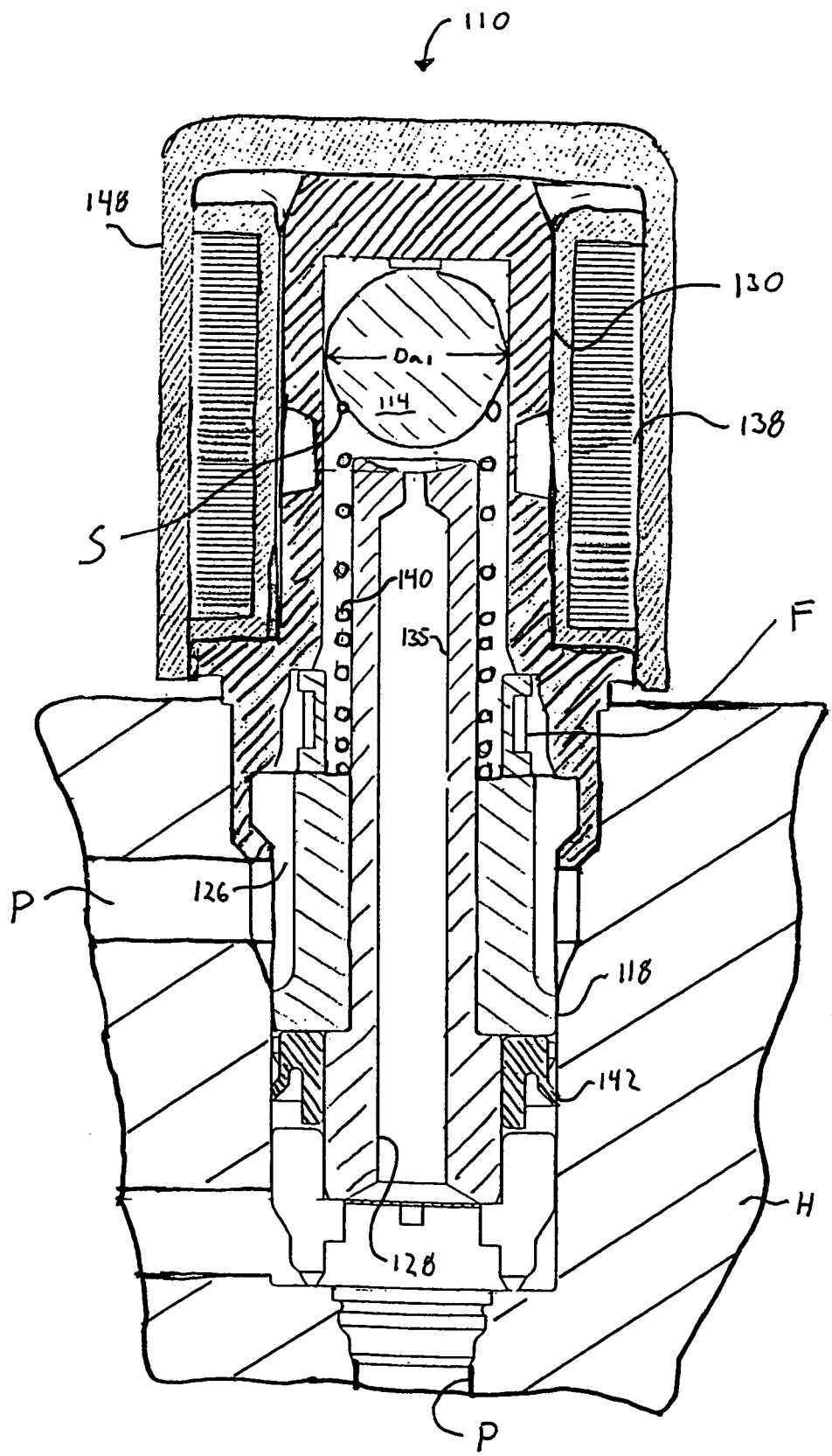
FIG. 4 is a sectional view of a normally open solenoid valve according to the present invention.

Referring now to FIG. 4, there is shown a normally open solenoid valve 110 with a spherical armature 114 in accordance with another preferred embodiment of the present invention. Components that are similar to those illustrated in the valve 10 illustrated in FIGS. 1, 2, and 3 and discussed above, are labeled with similar numbers.

The valve 110 may be disposed in a valve housing H which is provided with fluid passageways P, with the valve 110 disposed to control fluid flow through one or more of such passageways P by operation between a closed position and an open position. For example, the housing H may be that of a Hydraulic Control Unit (HCU) such as is employed in automotive brake systems. In such a case, the valve 110 may be used, for example, as an isolation valve selectively preventing fluid communication between a brake caliper (not shown) and a source of pressurized hydraulic brake fluid such as a master cylinder (not shown). However, it will be appreciated, in light of the following disclosure, that the invention may be practiced with valve housings other than automotive HCUs and that the housing H may be the housing of any component with which one would want to make use of the valve 110. It will also be appreciated that the valve 110 may be used as a dump valve in an automotive ABS brake system, or for any other suitable use.

Figure 5:
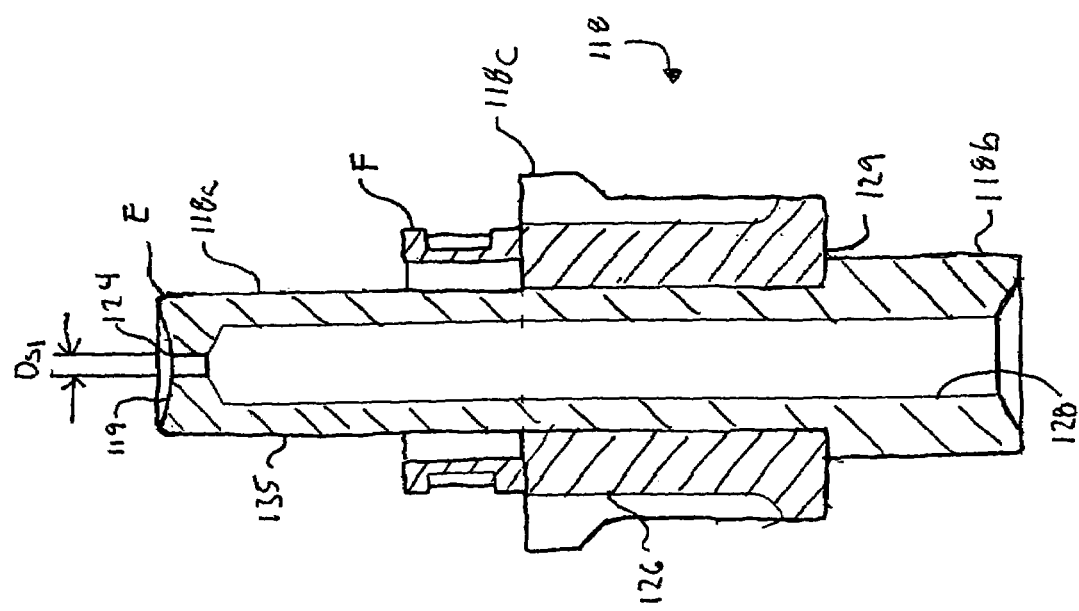
FIG. 5 is a sectional view of the valve body of FIG. 4.

The valve 110 includes a valve body 118. As best shown in FIG. 5, the body 118 has a first end 118a and a second end 118b. A generally radially outwardly extending flange 118c is formed on the body 118 toward the first end 118a, the purpose of which will be described below. The body 118 defines at least one first body fluid passageway 126, extending from the first end 118a to a point on the radially outer surface of the body 118 between the flange 118c and the second end 118b. The body 118 defines a second body fluid passageway 128 therethrough between the first end 118a and the second end 118b. The body includes a spring column 135 in the first end 118a, the purpose of which will be discussed below. The body 118 defines a valve seat 119 in the first end 118a.

The body 118 defines a circular opening 124 in the valve seat 119 and in the second body fluid passageway 128 at the first end 118a. The circular opening 124 has a diameter $D_{s1}$, as indicated by in FIG. 5. The body 118 further includes a circumferential step 129, the purpose of which will be described below.

Referring again to FIG. 4, the valve 110 preferably includes a filter F disposed in the fluid path therethrough. The filter F is suitable to strain debris from the fluid flowing through the valve 110, for example as to prevent the valve 110 from clogging. It must be understood however that the valve 110 need not include a filter F. As is the case throughout this description, the word "preferably" indicates that it is contemplated that the construction descried will be advantageous in certain uses, however it is also recognized that for various reasons it may be desired to construct the devise otherwise, and such construction is within the scope of the invention.

Preferably the valve 110 includes a bushing 142. The lip seal 142 is disposed against the circumferential step 129 (as best seen in FIG. 5). The lip seal 142 is in sealing engagement between the valve 110 and the housing H to restrict fluid communication directly through the housing, outside of the valve 110.

Figure 6:
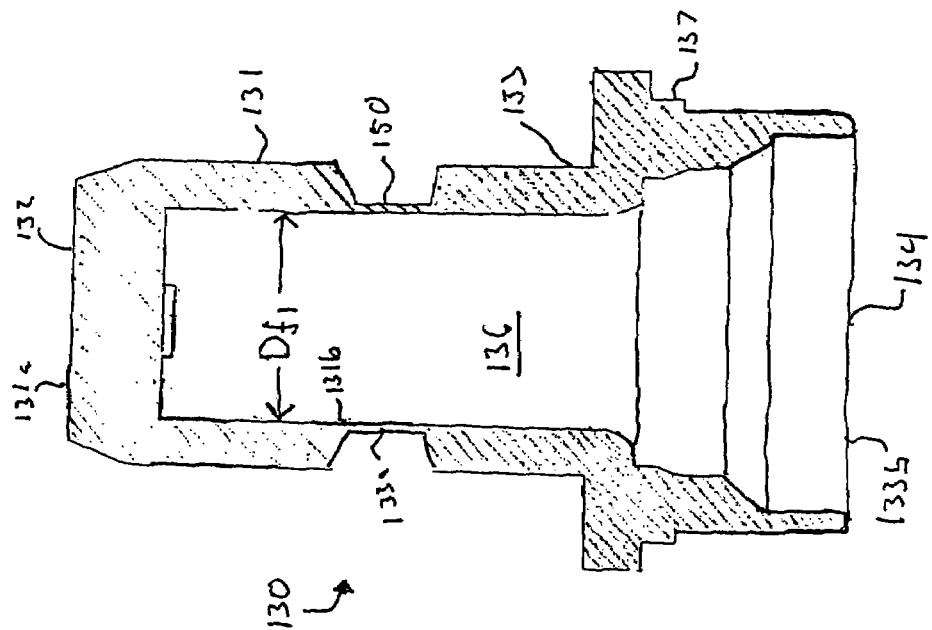
FIG. 6 is a sectional view of the flux tube of FIG. 4.

The valve 110 further includes a flux tube 130. As best shown in FIG. 6, the flux tube 130 has a pole portion 131 and a sleeve portion 133. The sleeve portion 133 includes a circumferential clinch portion 137, the purpose of which will be discussed below. Preferably, the pole portion 131 and the sleeve portion 133 are formed integrally. However, it must be understood that the pole portion 131 and the sleeve portion 133 may be formed separately and joined in any suitable manner.

The pole portion 131 has a first end 131a opposite the sleeve portion 133. The first end 131a defines a closed end 132 of the flux tube 130. The pole portion 131 has a second end 131b adjacent the sleeve portion 133. As will be further discussed below, the face of the second end 131b is preferably generally concave with respect to the rest of the pole portion 131 and preferably includes a protrusion, the purpose of which will be described below. Additionally, as will be described further below, it is contemplated that the exact contour of the face of the second end 131b will often not be a precise hemisphere, but rather that various bosses, lands, grooves, and curved or frustoconical surfaces may be provided on the face of the second end 131b to achieve a desired magnetic field contour (desired magnetic force versus travel characteristics) to support the design objectives of a particular application for the valve 110.

The sleeve portion 133 of the flux tube 130 has a first end 133a adjacent the pole portion 131. The sleeve portion has a second end 133b opposite the pole portion 131. The second end 133b defines an open end 134 of the flux tube 130. The sleeve portion 133 includes the circumferential clinch portion 137, the purpose of which is to secure the valve 110 in the housing H. In a preferred embodiment, a thin wall portion of the flux tube 130 between the armature receiving section 136 and the windings 138, generally indicated at 150 in FIG. 6, has a very small wall thickness relative to the rest of the flux tube 130. The thin wall portion 150 of the flux tube 130 allows the flux tube 130 to serve as both a pressure vessel and a primary part of the magnetic circuit as a single piece. The thin wall portion 150, though preferably formed of the same magnetic material as the rest of the flux tube 130, has a relatively high reluctance (low permeability to magnetic flux) owing to the physical thinness of the material in the thin wall portion. As discussed above, the purpose of the thin wall portion 150 is to resist the flow of magnetic flux therethrough, so that the majority of the magnetic flux of the solenoid valve 110, which will extend between the pole portion 131 and the sleeve portion 133 of the flux tube 130 will preferentially flow through the armature 114 to induce movement of the armature 114, rather than flowing through the thin wall portion 150. The thin wall portion 150 may short some of the magnetic flux, but when made thin enough or long enough to achieve a significant increase in reluctance (decrease in magnetic permeability) compared to a magnetic flux path through the armature 114, this magnetic flux "loss" will be minimized.

While preferably the flux tube 130 is formed integrally as a single piece, including the pole portion 131, the thin wall portion 150, and the sleeve portion 133, it is also contemplated that the flux tube 130 could be formed otherwise; the pole portion 131, thin wall portion 150, and the sleeve portion 133 may be formed separately and joined in any suitable manner. For example, the sleeve portion may be formed with an elongated thin wall cylindrical upper portion, with the pole portion disposed within the elongated cylindrical upper portion, and fixed to the elongated cylindrical upper portion in a fluid-tight manner. Other arrangements for fabricating a flux tube are known in the art, and may be used as suitable, including forming a pole portion, a cylindrical thin wall flux tube portion, and a clinch portion as separate components, and fixing these three components together in any suitable manner, including welding (in any manner), brazing, pressing, swaging, clinching, use of adhesives, etc., to form the flux tube. It is also contemplated that the thin wall portion 150 could be replaced by thick or thin wall portions made of a material with higher reluctance than the pole portion 131 or the armature 114, such as a low magnetic permeability stainless steel, or a ceramic or other non-magnetic material.

The flux tube 130 has a hollow armature receiving section 136 defined by the interior of the sleeve portion 133 and the second end 131b of the pole portion 131. The armature receiving section 136 has an inner diameter $D_{f1}$ as indicated by dashed lines in FIG. 6.

Referring again to FIG. 4, the armature receiving section 136 is in fluid communication with the first body fluid passageway 126 and the open end 34. The armature receiving section 36 is in fluid communication the second body fluid passageway 28 and the open end 34.

As indicated above, the valve 110 also includes the spherical armature 114. The armature 114 is preferably a standard ball bearing ball of standard material, for example 52100 steel. The armature 114 is also preferably of a standard hardness for ball bearings. However, it must be understood that the armature 114 may also be annealed if desired in order to minimize magnetic hysteresis. Further, it must be understood that the armature 114 may be made of any suitable material such as, another steel, steel alloy, or any suitable material with the desired magnetic properties.

For example, in a preferred embodiment, in a valve 110 where the ball armature 114 is smaller than the embodiment described above, the ball armature 114 of the valve 110 may be a ball bearing ball of annealed 1013 steel, optionally with a thin case hardened outer shell. The 1013 steel has a higher magnetic saturization than 52100 steel and thus gives a higher output force. Additionally, the annealed core has a much lower magnetic remanence (residual magnetism) and the case hardened shell allows the ball armature 114 to be ground with a standard ball bearing processes.

The spherical armature 114 is disposed in the armature receiving section 136 of the flux tube 130 for reciprocating movement therein between a closed position sealing against the body 118, as shown, to prevent flow through the second body fluid passageway 128 and an open position spaced apart from the body 118, not shown, permitting fluid flow through the second body fluid passageway 128. The armature 114 has a diameter $D_{a1}$, as indicated by dashed lines in FIG. 2, which is related to the diameter of the seat circular opening 124 and the diameter of the armature receiving section 136 according to the formula, $D_{f1} > D_{a1} > D_{s1}$.

A spring 140 is disposed about the spring column 135. The spring 140 urges the armature 114 toward the open position. Preferably, the spring 140 is in contact with the armature 114 for approximately 360 degrees, i.e., one "dead coil" is in contact with the armature 114, as indicated at S. This dead coil helps disrupt the laminar flow of fluid over the surface of the armature 114, and thus helps minimize the Bernoulli effect of such flow. Thus, the spring 140 preferably exerts a bias force on the armature 114 to separate the armature 114 from the seat 119 and minimizes any Bernoulli forces created by fluid flow, which would tend to retard motion of the armature 114 away from the seat 119. Most preferably, the spring 140 is a uniform coil with both ends having a dead coil, or flat ground, such that it does not matter which end thereof is disposed against the armature 114 and which end thereof is disposed against the spring column 135.

Preferably the body 118 includes a rounded edge at the end 118a, as indicated at E. The rounded edge E also helps reduce the Bernoulli forces, which are "negative forces" caused by the flow of the fluid. The faster a fluid flows the lower the pressure of the fluid, thus when fluid flows from the seat circular opening 124 the pressure drops and attracts the armature 114, i.e., during opening of the valve 110 the armature 114 may resist rapid opening due to low pressure created by the Bernoulli effect. The rounded edge E helps reduce this effect by separating flow from the region immediately around the armature 114, and thus works with the dead coil S in minimizing the Bernoulli effect hampering the rapid movement of the armature 114 away from the seat 119.

A winding 138 is disposed about the flux tube 130 for electromagnetically positioning the armature 114. The flux tube 130 forms a fluid tight pressure boundary between the winding 138 and the passageways 26, and 28.

Preferably, a casing 148 is disposed about the winding 138. Preferably, the casing 148 forms a seal with the flux tube 130 to enclose and protect the winding 138 and the pole portion 131.

To assemble the valve 110, the spring 140 is inserted onto the spring column 135, and the armature 114 is inserted into the armature receiving section 136 of the flux tube 130. As indicated above, preferably the spring 140 is reversible so that assembly is simplified because the spring 140 cannot be inserted backwards. Similarly, as the armature 114 is spherical, the armature 114 cannot be inserted backwards.

Next, the flux tube 130 is fixed to the body 118. As shown in FIG. 6, the second end 133b of the flux tube 130 is manufactured as a cylindrical skirt depending from the clinch portion 137 of the flux tube 130. The flux tube 130 is permanently fixed to the body 118 by axially mating the second end 133b of the flux tube 130 and the first end 118a of the body 118, and then inwardly permanently deforming the (crimping) the skirt portion of the second end 133b over the flange 118c as illustrated in FIG. 4. Of course, any suitable method of joining the flux tube 130 and the body 118 may suitably be used, and it is contemplated that the precise structure of the valve 110 would be suitably modified to provide for other methods of joining (or integral forming). The lip seal 142 may be assembled on the body 118 either before assembly to the flux tube 130, or before inserting the body 118 into the valve bore 117.

The preferred shape of the second end 131b is close to hemispherical with an axial protrusion, the hemisphere with a radius slightly bigger than the radius of the Armature 114, i.e. ½ $D_{a1}$. In an alternative embodiment, the shape of the second 131b may be slightly parabolic with an axial protrusion. It must be understood, however, that the shape of the second end 131b may include multiple chamfers as desired to minimize manufacturing cost. It is anticipated that the inclusion of the chamfers will cause only a very slight degradation of output force.

The clearance between the armature 114 and the thin section 150, i.e. ½ the difference between $D_{f1}$ and $D_{a1}$, is preferably from about approximately 50 to about approximately 200 microns diametral. The clearance allows fluid to flow around the armature 114. Thus, the armature 114 may move generally freely while fluid in the armature receiving section 136 between the armature 114 and the second end 131b of the pole portion 131 still provides damping characteristics that can be beneficially used to control intermediate travel positioning of the armature 114 with respect to the seat 119. The control intermediate travel positioning of the armature 114 may be achieved, for example, with different input dither and/or duty cycle signals.

Further, when the diameter $D_{a1}$ of the armature 114 is maximized, i.e. $D_{a1}$ is as close to as possible but smaller than $D_{f1}$, and the armature 114 is large relative to the rest of the valve 110, radial magnetic forces in addition to the axial magnetic forces act upon the armature 114 to "push" the armature 14 on the seat 19 against pressure and force provided by the spring 140. Thus, magnetic coupling between the flux tube 130 and the armature 114 is maximized and in turn maximizes the output force. The axial force component has a high moment arm to help seat the hydraulic unseat forces with their much lower moment arm. This allows the magnetic forces of the armature 114 to overcome higher hydraulic unseating forces than prior designs with conventional cylindrical armatures. Further, radial forces are typically detrimental to prior designs with normally configured cylindrical armatures in that they cause friction, which results in coulomb hysteresis and lower useful output force. It must be appreciated, however, that the spherical armature 114 in the preferred embodiment of the present invention is attracted to the thin section 150 of the flux tube 130 and rolls up the thin section 150. Thus, the armature 114 has extremely low moving or rolling resistance, and thus make more efficient use of output force, as compared to prior designs.

Preferably, the radius of the sealing area of the seat 119, i.e. half of $D_s$, is greater than the radial clearance of the armature 114 in the flux tube 130, i.e. the difference between half of $D_f$ and half of $D_a$. For example, a preferred combination of the radius of the sealing area and of the clearance of the armature 114 is a clearance of 0.450 millimeter and a radius of 0.050 millimeter. In such a case magnetic forces, which "push" the armature 114 onto the seat 119 tend to have an axial component, which is over the seat sealing cylinder area, or circular opening 24, and thus cause the armature 114 to center and seal on the seat 119.

It will be noted that in the preferred embodiment the valve 110 is secured to the housing (not shown) by the clinch portion 137. However, it must be appreciated that the valve may be secured to the housing (not shown) in any suitable manner, such as welding or by threaded engagement of the valve 110 and housing (not shown) or by any other suitable manner.

In a preferred embodiment, the seat 119 is ferromagnetic to attract the armature 114 when the valve 110 is energized. Current hybrid isolation valves have a large radial gap in the magnetic circuit between the seat and the second end of the pole portion of the flux tube. In another preferred embodiment the seat 119 is magnetically coupled to the flux tube 30 by either an additional ferromagnetic washer (not shown), or a seat 119 whose ferromagnetic outside diameter, at the first end 118a of the body 118, fits into and is crimped to the flux tube 30 inside diameter, at the second end 133b of the sleeve portion 133, for a low reluctance magnetic coupling.

It must be appreciated that while the axial magnetic force of the armature 114 to seat the armature 114 is important, it is also important in some embodiments that the magnetic radial forces tending to pull the armature 114 off the seat sealing area, i.e. the circular opening 124, be less than the axial magnetic forces that keep the armature 114 sealing on the seat 119. Thus, the magnetic shaping of the seat 119 is very important.

For example, in one preferred embodiment the pole portion 131 includes a deeper bore thus increasing the volume of the armature receiving section 136. Further, the first end 118a forms a pole end and the radius of the pole end, including the seat 119, is close to the radius of the ball armature 114, without the two radii being so close (too equal) to each other that Bernoulli forces reduce pressure on the area of the ball armature 114 near the seat 119. In one preferred embodiment, the radius of the first end 118a is approx. 5.50 millimeters (63%) greater than the 3.37 millimeter radius of the ball armature 114. Additionally, the spring 140 preferably has close ground end coils that surround the first end 118a, approx. 0.35 millimeter, on the outer edge to separate high velocity flow from the ball armature 114.

In operation of one preferred embodiment, pressure is preferably applied to the first body fluid passageway 126, of the valve 110. As such, the pressure differential between the first body fluid passageway 126 (the supply port) and the second body fluid passageway 128 (the output port), plus the spring force of the spring 140 holds the ball armature 114 away from the seat 119, when in the normal (open) position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A valve comprising:
    a valve body defining a first body fluid passageway and a second body fluid passageway therethrough;
    a flux tube having a closed end and an open end, said open end being in fluid communication with said first body fluid passageway and said second body fluid passageway, said flux tube having a pole portion and a cylindrical sleeve portion, said pole portion having a substantially concave face adjacent said sleeve portion, said substantially concave face of said pole portion and the interior of said sleeve portion defining a hollow armature receiving section;
    a spherical armature disposed in said armature receiving section of said flux tube for reciprocating movement therein between a closed position sealing against said body to prevent communication between said first body fluid passageway and said second body fluid passageway and an open position spaced apart from said body permitting communication between said first body fluid passageway and said second body fluid passageway;
    a winding disposed about said flux tube for electromagnetically positioning said armature, said flux tube forming a fluid tight pressure boundary between said winding and said first and second body fluid passageways; and
    a spring urging said armature toward said closed position.

2. The valve of claim 1 wherein said first body fluid passageway is a fluid inlet and said second body fluid passageway is a fluid outlet.

3. The valve of claim 1 wherein said first body fluid passageway is a fluid outlet and said second body fluid passageway is a fluid inlet.

4. The valve of claim 1 wherein said substantially concave face includes at least one of a hemispherical section and a partial conical section.

5. The valve of claim 4 wherein said substantially concave face includes the other of said hemispherical section and said partial conical section and further includes a radiused transition section there between said hemispherical section and said partial conical section.

6. The valve of claim 1 wherein said substantially concave face at least one of a boss, a land, a groove, a curved surface and a frustoconical surface.

7. The valve of claim 1 wherein said substantially concave face has a significantly larger radius than said spherical armature.

8. The valve of claim 1 wherein the outer circumference of said substantially concave face is formed as an annular area centered about the longitudinal axis of said pole portion.

9. The valve of claim 8 wherein said annular area is formed as an at least partially inverted conical section.

10. The valve of claim 8 wherein said annular area is formed as a flat annular area.

11. The valve of claim 8 wherein said annular area includes at least one of a U-shaped groove, a V-shaped groove, a square groove, and an interrupted groove.

* * * * *